United States Patent

[11] 3,566,732

| [72] | Inventors | Mark Hasten<br>Indianapolis, Ind.;<br>Lee S. Jones, Berwyn, Pa.; Floyd Lobash,<br>Minneapolis, Minn. |
|---|---|---|
| [21] | Appl. No. | 793,330 |
| [22] | Filed | Jan. 23, 1969 |
| [45] | Patented | Mar. 2, 1971 |
| [73] | Assignee | General Mills, Inc. |

[54] VENDING MACHINE
4 Claims, 6 Drawing Figs.

[52] U.S. Cl. ................................................ 83/205,
83/224, 83/267, 221/71
[51] Int. Cl. ............................................... B65h 5/28
[50] Field of Search .......................................... 83/203,
205, 224, 267; 221/71, 80

[56] References Cited
UNITED STATES PATENTS

| 661,130 | 11/1900 | Pape | 221/71X |
| 772,503 | 10/1904 | Dodson | 221/71X |
| 1,793,165 | 2/1931 | Eckmann | 221/71X |
| 1,813,934 | 7/1931 | Knee | 221/71X |
| 2,684,655 | 7/1954 | Kuhnle | 83/205X |
| 3,153,361 | 10/1964 | Allen | 83/203 |

Primary Examiner—William S. Lawson
Attorneys—Anthony A. Juettner, William C. Babcock and Harold D. Jastram ABSTRACT: A vending machine using a rotary conveyor to move a strip of individual items from a storage area in the machine to a cutter which severs individual items from the strip as a purchaser purchases the items and operates the vending machine.

Patented March 2, 1971

INVENTORS
MARK HASTEN
LEE S. JONES
FLOYD LOBASH
BY *Harold D. Jastram*
ATTORNEY

INVENTORS
MARK HASTEN
LEE S. JONES
FLOYD LOBASH
BY Harold D. Justiam
ATTORNEY

VENDING MACHINE

Typically, vending machines have utilized a rather complicated storage and transporting mechanism in order to carry items of food products from a storage area to a deposit bin when they are purchased by the consumer. The present invention contemplates a simple method of conveying such products from a storage area to a deposit area with a minimum of complicated mechanism.

It is therefore an object of the present invention to provide a new and improved vending apparatus.

It is another object of the present invention to provide a new and improved vending machine which transports a strip of individual food items to a cutter which severs the strip at preselected points for deposit upon purchase by a consumer.

With these and other objects in view, the present invention contemplates a rotary conveyor having equally spaced pockets designed to accommodate a particular product which is packaged in a continuous strip. These individual items are conveyed to a discharge bin by rotation of the rotary conveyor which engages the strip and carries the strip in the fashion of a belt and chain to a point where the individual items are severed from the strip by a cutter.

A complete understanding of the invention may be obtained from the following detailed description of specific embodiments thereof, when read in conjunction with the drawings in which.

Figure 1:
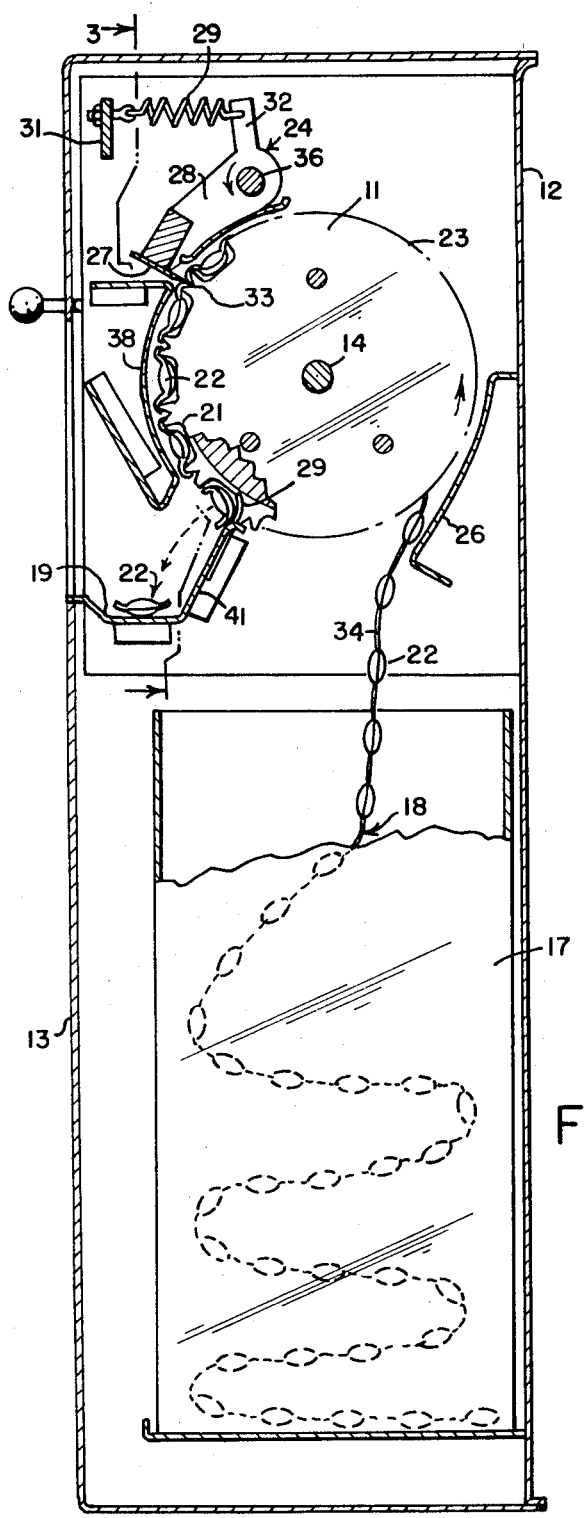
FIG. 1 is a side view partially in cross section of a vending machine in accordance with the present invention.
Figure 4:
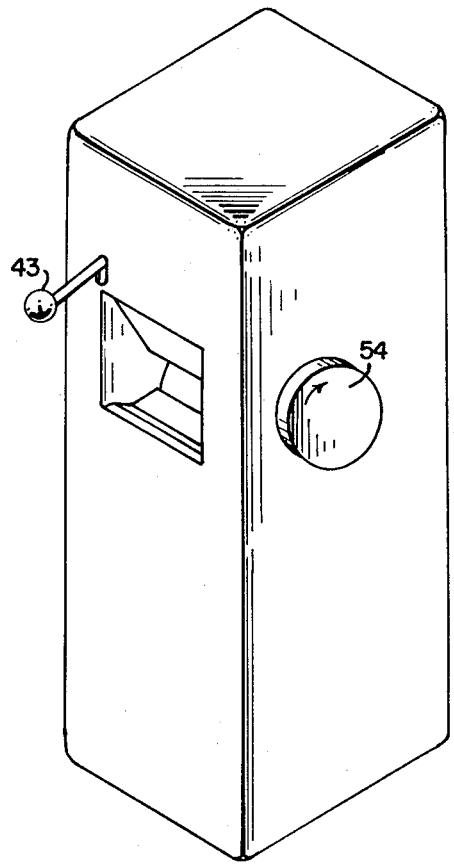
FIG. 4 is an isometric view of the vending machine.

Refer first to FIG. 1 of the drawings which shows a side cross-sectional view of the machine. A rotary conveyor 11 is mounted for rotation within the upper portion 12 of a housing 13. The rotary conveyor 11 rotates about shaft 14 which is mounted in housing 13. It will be observed in FIG. 3 of the drawings, that the shaft 14 is mounted in the housing 13 through the use of mounting brackets 16.

The lower area of housing 13 is a storage area 17 for storing a strip 18 of product for vending purposes. This strip 18, of food product in the preferred embodiment, is a continuous strip of material which engages the conveyor 11 at one end of the strip 18 for conveyance about the conveyor 11 and ultimate dposit in discharge bin 19. Conveyor 11 is essentially a wheel in the periphery of which are pockets 21 for accepting individual items 22 of product. The items 22 are connected in the continuous trip strip 18 of product. The pockets 21 are equally spaced about the periphery 23 of the conveyor 11 and are shaped to accept the individual items 22 of product in an efficient manner for conveyance from the storage area 17 to the cutting assembly 24.

Figure 6:
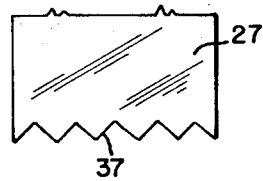
FIG. 6 is a fractional view illustrating a knife blade.

A shield 26 insures that the strip 18 properly engages the conveyor 11 which rotates in the arrow direction illustrated in FIG. 1 of the drawings. The strip of product 18 is conveyed about the wheel or conveyor 11 to a knife 27 which is mounted on arm 28. Arm 28 is spring biased by a spring 29 which is a tension spring. Spring 29 is rigidly connected by bracket 31 to frame 13 and the other end of spring 29 is connected to arm 28 by extension 32. It will be observed that the tension spring 29 will force the arm 28 to move in the arrow direction, illustrated in FIG. 1 of the drawings, thus forcing the knife 27 to engage a depression 33 in the periphery of the conveyor 11. A depression 33 is located between each of the pockets 21 and provides an area for the knife 27 to engage the web 34 interconnecting each of the individual items 22 of the product. As the arm 28 pivots about shaft 36, the knife blade 27, which is preferably serrated as illustrated in FIG. 6 of the drawings, engages the web 34 and severs the web 34 so that the individual items 22 are no longer connected beyond the cutter 27.

A serrated edge 37 is preferred since it penetrates the web 34 efficiently and insures a positive cut of the web 34.

Figure 3:
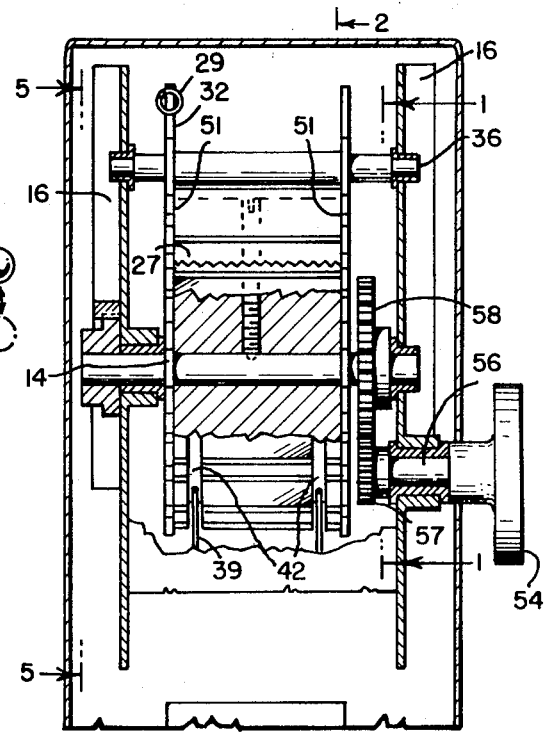
FIG. 3 is a fractional partially cross-sectional view taken along line 3–3 of FIG. 1.

The individual items 22 are conveyed beyond cutter 27 by continued operation of the conveyor 11 in the arrow direction as illustrated in FIG. 1 and are held in individual pockets 21 by a shield 38. This shield traps the individual items 22 in the pockets 21 until they arrive at a point adjacent the discharge bin 19 at which time the individual items 22 fall under the force of gravity into the bin 19. Since it is desirable at this point to insure discharge of the individual items 22 from the pocket 21, a pair of stripping fingers 39, see FIGS. 1 and 3, are mounted on an extension 41 of bin 19. The fingers 39 travel in grooves 42 (see FIG. 3 of the drawings) and engage the individual items 22 in the pockets 21 to insure positive discharge of the items.

Figure 5:
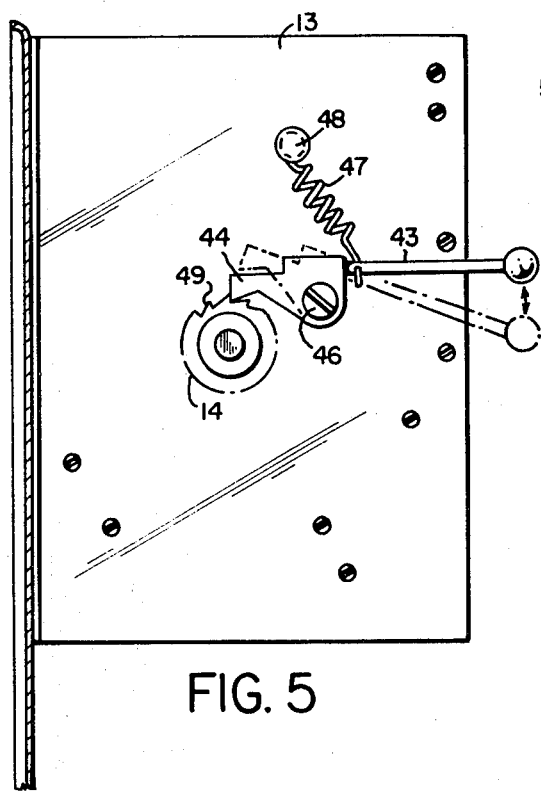
FIG. 5 is a fractional side view taken along line 5–5 of FIG. 3.

Refer now to FIG. 5 of the drawings which shows an operating lever 43 which pivots a catch 44 about a pivot point 46. Lever 43 is spring biased by a tension spring 47. Spring 47 is connected by a pin 48 to housing 13. The spring 47 forces the lever 43 in the upper direction as viewed in FIG. 5 so that catch 44 engages a ratchet 49. Rachet 49 is connected to shaft 14 which is also the shaft on which conveyor 11 is rigidly connected. When the cutter is to be released for cutting, the handle 43 may be lowered to the dotted position illustrated in FIG. 5 of the drawings or in the downward direction as illustrated in FIG. 5.

Figure 2:
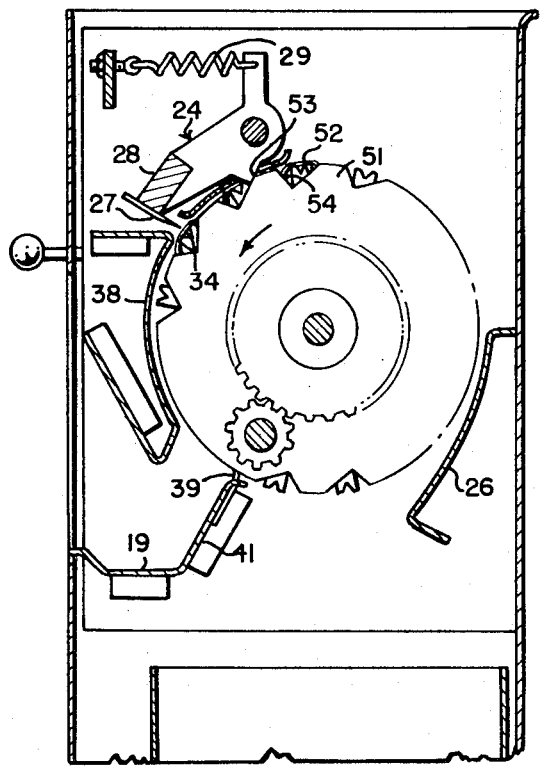
FIG. 2 is a fractional view taken along line 1–1 of FIG. 3.

As the handle 43 is lowered by an operator, ratchet 49 is released to permit the conveyor 11 to be rotated in the arrow direction illustrated in FIGS. 1 and 2. On either side of conveyor 11 a cam 51 is mounted for rotation with the conveyor 11. This cam 51 has camming surfaces 52 which engage a cam follower 53 on the cutter 24. As the conveyor 11 and cam 51 are rotated in the arrow direction illustrated in FIG. 2 of the drawings, the cutting blade 27 is maintained out of contact with web 34 of the product strip 18 until cam follower 53 is released by surface 54. When cam follower 53 is released spring 29 rotates arm 28 in the arrow direction and forces the knife 27 through the web 34 thus severing the web.

Reference to FIG. 3 will illustrate that there are two cams mounted on either side of the conveyor 11 for rotation with the conveyor. Likewise there are a pair of arms 28 between which blade 27 is mounted to sever the web 34.

The cams 51 and the conveyor 11 are operated by an operator rotating handle 54 in the arrow direction illustrated in FIG. 1 of the drawings or in the clockwise direction illustrated therein. Handle 54 is mounted on a shaft 56 on which a spur gear 57 engages a spur gear 58 mounted on shaft 14. Gear 58 rotates the conveyor 11 and the cams 51 after handle 43 as been depressed as illustrated in FIG. 5 of the drawings to release the shaft 14.

Release of shaft 14 by the handle 43 permits an operator to rotate the conveyor 11 through an arc sufficient to release only one item 22 from beyond shield 38 illustrated in FIG. 1 of the drawings. Thus it will be noted that one operation of lever 43 and handle 54 will result in deposit of a single item 22 of product.

Since this is a vending machine, which will be used for selling goods, obviously the mechanism for releasing shaft 14 will be different from a handle-operated system. What is contemplated is a con release mechanism, which is quite common in the industry, to replace the handle-operated mechanism in FIG. 5. Thus by inserting a coin in a conventional coin-operated system, the shaft 14 is released after which the purchaser will operate handle 54 to obtain the product which he has purchased for a coin. The mechanism illustrated in FIG. 5 is one example of how the machine may operate and was used for illustrative purposes. The coin-operated system is an obvious duplication of that illustrated and is contemplated within this application.

The above-mentioned illustrations and examples are merely illustrative of the principles of the invention. Numerous other arrangements may be readily devised by those skilled in the art which will embody the principles of the invention and fall within the spirit and scope thereof.

We claim:

1. A vending machine which comprises a housing having a storage area and a product discharge bin, a rotary conveyor means mounted in said housing and mounted adjacent the discharge bin, a continuous strip of product in the storage area of said housing having one end engaging said conveyor means, said strip of product being composed of individual items of product equally spaced along the length of the strip, said conveyor means being in the form of a wheel having pockets equally spaced along the periphery and designed to accept said individual items of product, a cutting means mounted in said frame adjacent to the periphery of said conveyor means and externally thereof, for cutting said product into pieces of predetermined length, said cutting means including a knife mounted on a cam-operated arm, actuating means mounted on said conveyor means for actuating said cutting means, said actuating means including a cam mounted on said rotary conveyor, control means connected to said conveyor means for restricting movement of said conveyor means, means connected to said control means for disengaging said control means from said conveyor means, and means for rotating said conveyor means upon disengagement of said control means.

2. A vending machine in accordance with claim 4 which further includes a shield mounted adjacent to the periphery of said conveyor means and extends along a portion of the periphery to capture said individual items of product in the pockets of said conveyor.

3. A vending machine in accordance with claim 1 in which said knife blade is serrated, and it is pivotable about an axis stationary with respect to the rotatable conveyor means.

4. A vending machine in accordance with claim 1 which further includes at least one peripheral groove formed in the rotary conveyor, and at least on stripping finger mounted on said housing adjacent the discharge bin, a portion of said finger being positioned within said groove and cooperating with said rotary conveyor to insure discharge of the product from said conveyor into the discharge bin.